(No Model.)
O. F. LAGERQUIST.
ATTACHMENT FOR MEASURES.
No. 343,908. Patented June 15, 1886.
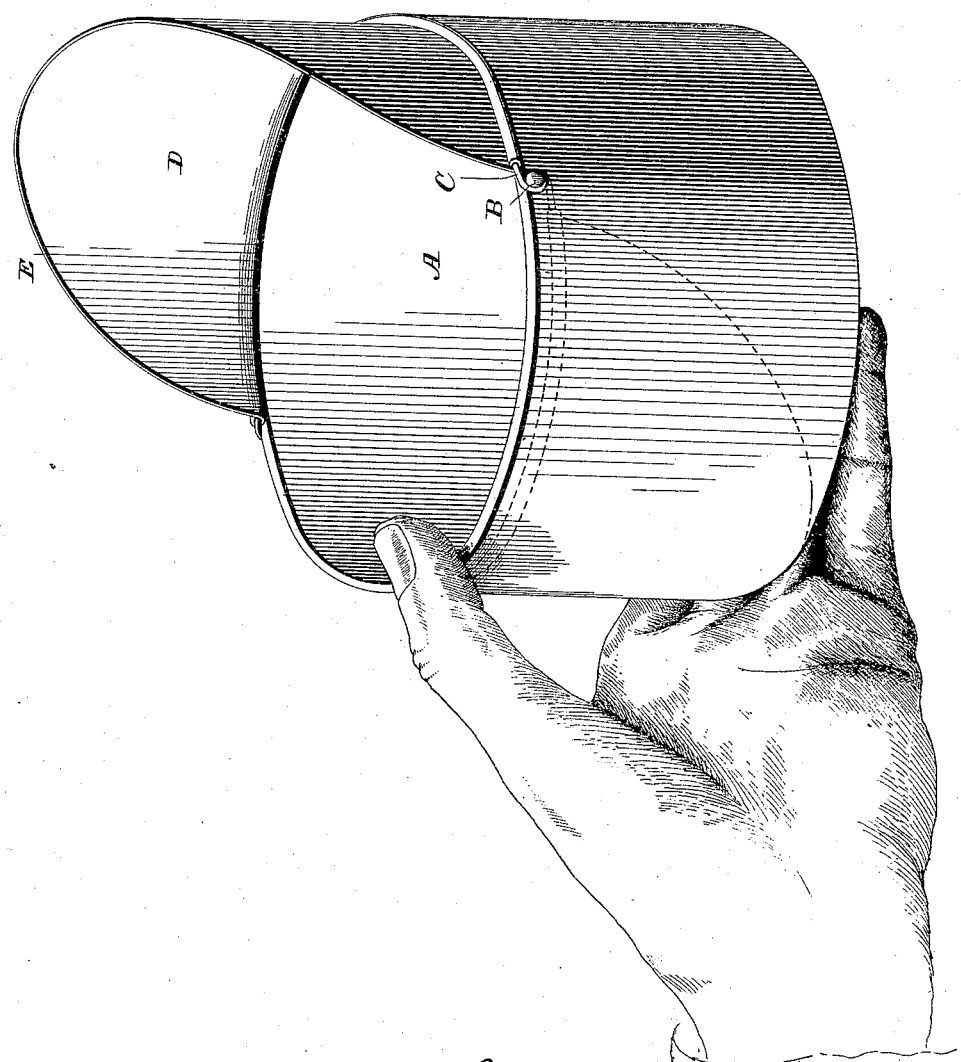
WITNESSES
INVENTOR
Oscar F. Lagerquist
Attorney

UNITED STATES PATENT OFFICE.

OSCAR F. LAGERQUIST, OF MACON, GEORGIA.

ATTACHMENT FOR MEASURES.

SPECIFICATION forming part of Letters Patent No. 343,908, dated June 15, 1886.

Application filed April 8, 1886. Serial No. 198,248. (No model.)

*To all whom it may concern:*

Be it known that I, OSCAR F. LAGERQUIST, a citizen of the United States of America, residing at Macon, in the county of Bibb and State of Georgia, have invented certain new and useful Improvements in Attachments for Measures; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

My invention relates to certain new and useful improvements in attachments for dry-measures, whereby a measuring-vessel may be readily converted into a scoop; and to this end my invention consists in pivoting near the upper end of the measure a curved segmental section which may be turned on its pivots so as to lie upon the rim of the measuring-vessel or turned down against the side of said vessel, so as to lie beneath the upper edge of the same, as will be hereinafter fully set forth, and specifically pointed out in the claims.

In the accompanying drawing, which illustrates my invention, the figure is a perspective view of my improvement, showing a measuring-vessel with my scoop attachment applied thereto.

A refers to the measuring-vessel, which is of ordinary construction and preferably a cylindrical vessel of a standard size, having a straight upper edge, as shown, and at a slight distance below the upper edge of the vessel are attached pivot-pins B, to which are secured a wire bail, C, the ends of which are bent downwardly and formed into eyes, so as to embrace the pivot pins.

D refers to the body portion of the scoop, the edge E thereof being curved, as shown. The lower or straight edge is bent around the wire bail so as to be securely attached thereto.

When it is desired to employ my attachment as a scoop, the portion D is folded or turned so that the wire bail B and the lower edge of the scoop D will lie upon the upper edge of the vessel A, and when in this position substances may be scooped up and lifted into the measuring-vessel. When it is desired that the measuring-vessel should present a straight edge, the scoop portion D is folded down against the side of the measure, as shown in dotted lines, the bail thereof, owing to the ends thereof being bent, lying beneath the upper edge of said vessel, so that the upper edge will have a smooth surface, over which the leveling-board may be passed, so as to insure proper measurement.

The device hereinbefore described is extremely simple in construction and may be applied to measuring-vessels already manufactured. The advantages and utility of this improvement will be obvious.

I claim—

1. The combination, with a vessel, of a scoop pivoted thereto, for the purpose set forth.

2. The combination, with a cylindrical vessel, of a curved bail having its ends pivotally connected to the cylindrical vessel, and a scoop, D, connected to said bail, substantially as described.

3. In combination with a cylindrical vessel provided with pivot-pins B below the upper edge of the same, a bail having a curved segmental portion secured thereto, the ends of said bail being curved and formed into eyes, so as to embrace the pivot-pins, substantially as shown, and for the purpose set forth.

In testimony whereof I affix my signature in presence of two witnesses.

OSCAR F. LAGERQUIST.

Witnesses:
ELIHU S. MCLEAN,
WILLIAM ABEL.